(12) United States Patent
Sharma et al.

(10) Patent No.: US 10,467,494 B2
(45) Date of Patent: Nov. 5, 2019

(54) METHOD AND SYSTEM FOR CONTAINER CODE RECOGNITION

(71) Applicant: Tata Consultancy Services Limited, Mumbai (IN)

(72) Inventors: Monika Sharma, Gurgaon (IN); Lovekesh Vig, Gurgaon (IN); Ramya Sugnana Murthy Hebbalaguppe, Gurgaon (IN); Ehtesham Hassan, Gurgaon (IN); Ankit Verma, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 112 days.

(21) Appl. No.: 15/839,004

(22) Filed: Dec. 12, 2017

(65) Prior Publication Data

US 2018/0173988 A1 Jun. 21, 2018

(30) Foreign Application Priority Data

Dec. 16, 2016 (IN) .............................. 201621042986

(51) Int. Cl.
*G06K 9/34* (2006.01)
*G06K 9/62* (2006.01)
(Continued)

(52) U.S. Cl.
CPC ......... *G06K 9/344* (2013.01); *G06K 9/00449* (2013.01); *G06K 9/6289* (2013.01);
(Continued)

(58) Field of Classification Search
CPC ........... G06K 2209/01; G06K 9/00456; G06K 9/325; G06T 7/11; G06T 2207/20084
See application file for complete search history.

(56) References Cited

U.S. PATENT DOCUMENTS 6,339,651 B1 1/2002 Tian et al.
8,885,951 B1 * 11/2014 Cristofano ......... G06K 9/00449
382/173
(Continued)

OTHER PUBLICATIONS

A. Verma, M. Sharma, R. Hebbalaguppe, E. Hassan and L. Vig, "Automatic Container Code Recognition via Spatial Transformer Networks and Connected Component Region Proposals," 2016 15th IEEE International Conference on Machine Learning and Applications (ICMLA), Anaheim, CA, 2016, pp. 728-733. (Year: 2016).*
(Continued)

*Primary Examiner* — Ross Varndell
(74) *Attorney, Agent, or Firm* — Finnegan, Henderson, Farabow, Garrett & Dunner LLP

(57) ABSTRACT

This disclosure relates generally to character detection and recognition, and more particularly to a method and system for container code recognition via Spatial Transformer Networks and Connected Component. The method comprises capturing an image of a container using an image capture device which is pre-processed using an image preprocessing module. The method further comprises extracting and filtering region proposals from the pre-processed image using a region extraction module to generate regrouped region proposals. The next step comprises classifying the regrouped region proposals into characters by implementing trained Spatial Transformation Network to generate a valid group of region proposal with more than one chunk of container identification code using a classification module, and lastly a sequence for the valid group of region proposal is generated and the generated sequence is mapped to a predefined standard container identification code to determine a container identification code, wherein the predefined standard identification code comprises chunks of characters in a predefined pattern.

17 Claims, 5 Drawing Sheets

ISO:6346 Container Code Pattern

AAAA DDDDDD DDAD where A represents an alphabet

D represents a digit

(51) Int. Cl.
  *H04N 5/77*  (2006.01)
  *H04N 5/781* (2006.01)
  *G06K 9/00*  (2006.01)
  *G06K 9/72*  (2006.01)
  *G06T 7/11*  (2017.01)
  *G06K 9/32*  (2006.01)

(52) U.S. Cl.
  CPC .............. *H04N 5/77* (2013.01); *H04N 5/781* (2013.01); *G06K 9/00456* (2013.01); *G06K 9/325* (2013.01); *G06K 9/726* (2013.01); *G06K 2209/01* (2013.01); *G06T 7/11* (2017.01); *G06T 2207/20084* (2013.01)

(56) References Cited

U.S. PATENT DOCUMENTS

| | | | | |
|---|---|---|---|---|
| 2009/0180683 | A1* | 7/2009 | Lee | G06K 9/6289 382/156 |
| 2011/0158548 | A1 | 6/2011 | Aizawa | |
| 2017/0132760 | A1* | 5/2017 | Kothule | G06T 3/4046 |
| 2017/0345153 | A1* | 11/2017 | Wang | G06T 7/11 |
| 2018/0173988 | A1* | 6/2018 | Sharma | G06K 9/344 |

OTHER PUBLICATIONS

Max Jaderberg, Karen Simonyan, Andrew Zisserman, Koray Kavukcuoglu, "Spatial Transformer Networks," Google DeepMind, London, UK , Feb. 4, 2016, https://arxiv.org/pdf/1506.02025.pdf. (Year: 2016).*

F. Zhao, J. Li, J. Zhao and J. Feng, "Weakly Supervised Phrase Localization with Multi-scale Anchored Transformer Network," 2018 IEEE/CVF Conference on Computer Vision and Pattern Recognition, Salt Lake City, UT, 2018, pp. 5696-5705. (Year: 2018).*

X. Cao, G. Gong, M. Liu and J. Qi, "Foreign Object Debris Detection on Airfield Pavement Using Region Based Convolution Neural Network," 2016 International Conference on Digital Image Computing: Techniques and Applications (DICTA), Gold Coast, QLD, 2016, pp. 1-6. (Year: 2016).*

* cited by examiner

ISO:6346 Container Code Pattern

AAAA DDDDDD DDAD where A represents an alphabet
D represents a digit

FIG. 5

METHOD AND SYSTEM FOR CONTAINER CODE RECOGNITION

PRIORITY CLAIM

This U.S. patent application claims priority under 35 U.S.C. § 119 to: India Application No. 201621042986, filed on Dec. 16, 2016. The entire contents of the aforementioned application are incorporated herein by reference.

TECHNICAL FIELD

This disclosure relates generally to character detection and recognition, and more particularly to a method and system for container code recognition via Spatial Transformer Networks and Connected Component.

BACKGROUND

Millions of ship containers are transported to and from the worlds' shipping ports every day. Accurate book-keeping of these containers is vital to ensure timely arrival and dispatch of goods for trade. Each container is granted a unique identification serial code, which is manually recorded when the container arrives at or leaves a port.

An automated system for reading of container codes from camera would be faster, cheaper and more reliable. However, automated reading and recording of container numbers at human performance levels has been a challenge due to the corrugated container surface, different background layouts, and variations in colors, font types, sizes, illumination, blur, orientations and other photometric distortions. The corrugated surface, in particular, implies that the character and font is distorted owing to a 2D projection from a 3D object, causing standard OCR techniques to perform poorly. Other challenges include rust on the container, mud, peeling paint and external factors such as varying lighting conditions, rain, fog, snow which affect the contrast of the grabbed vehicle or container images.

The performance of conventional image processing based methods for locating the container code regions which are recognized using a SVM classifier depends heavily on the positioning of the camera capturing the container image. Moreover, majority of prior art teaches methods and systems that use multiple modalities like vision and RFIDs for identification which have installation costs. The efficacy of existing methods for container code recognition where texts are printed on a corrugated surface still remains question. Additionally, none of these methods are capable of dynamically adapting to distortions like Spatial Transformation Network.

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a method and system for container code recognition via Spatial Transformer Networks and Connected Component.

The present application provides a computer implemented method for container code recognition via Spatial Transformer Networks (STN) and Connected Component (CC), wherein said method comprises capturing an image of a container using an image capture device (200) wherein the image contains the container identification code. This captured image is pre-processed using an image preprocessing module (210). The method further comprises extracting and filtering region proposals from the pre-processed image using a region extraction module (212) to generate regrouped region proposals, wherein extraction and filtration is performed by implementing connected components (CC). Next the method provides the step to classify the regrouped region proposals into characters by implementing trained Spatial Transformation Network (STN) to generate a valid group of region proposal with more than one chunk of container identification code using a classification module (214). Lastly in accordance to the method disclosed herein a sequence for the valid group of region proposal is generated and the generated sequence is mapped to a predefined standard container identification code to determine a container identification code using a code identification module (216), wherein the predefined standard identification code comprises chunks of characters in a predefined pattern.

In another aspect, the present application provides a system (102) for the container code recognition via Spatial Transformer Networks (STN) and Connected Component (CC) comprising a processor (202), a memory (204) and an image capture device (200) operatively coupled with said processor. The image capture device (200) configured to capture an image of a container wherein the image contains the container identification code which is then preprocessed using an image preprocessing module (210). The system (102) further comprises a region extraction module (212) configured to extract and filter region proposals from the pre-processed image to generate regrouped region proposals, wherein extraction and filtration is performed by implementing connected components (CC). Further the system (102) a classification module (214) configured to classify the regrouped region proposals into characters by implementing trained Spatial Transformation Network (STN) to generate a valid group of region proposal with more than one chunk of container identification code. The system (102) further comprises a code identification module (216) configured to generate a sequence for the valid group of region proposal and mapping the generated sequence to a predefined standard container identification code to determine a container identification code, wherein the predefined standard identification code comprises chunks of characters in a predefined pattern.

In yet another aspect, one or more non-transitory machine readable information storage mediums comprising one or more instructions is provided. The instructions when executed by one or more hardware processors causes capturing an image of a container using an image capture device (200) wherein the image contains the container identification code; pre-processing the captured image using an image preprocessing module (210); extracting and filtering region proposals from the pre-processed image using a region extraction module (212) to generate regrouped region proposals, wherein extraction and filtration is performed by implementing connected components (CC); classifying the regrouped region proposals into characters by implementing trained Spatial Transformation Network (STN) to generate a valid group of region proposal with more than one chunk of container identification code using a classification module (214); generating a sequence for the valid group of region proposal and mapping the generated sequence to a predefined standard container identification code to determine a container identification code using a code identification module (216), wherein the predefined standard identification code comprises chunks of characters in a predefined pattern; triggering an alert when a container identification code is not determined by the code identification module (216) after generating and mapping the valid group of region proposal; validating the determined container identification code using checksum digit for ISO 6346 code; image preprocessing by resizing the images to double the original size of the image; and binarizing the resized image separate one or more characters of the container code in the image; generating regrouped region proposal by extracting region proposal using connected components wherein the extracted region proposal are according to the structure of the predefined standard code filtering false positive from the extracted region proposals and regrouping the region proposal after elimination of false positives based on similarity of spatial position and sequence of region proposals of similar heights; generate a valid group of region by classifying grouped region proposals to characters by using trained STNs including a STN for alphabets (STNalp) and a STN for digits (STNd) matching the grouped region proposals to the characters from a predefined standard code directory to generate valid region proposals wherein the predefined standard code directory comprises at least one chunk of characters of the predefined standard identification code; and generating a sequence by determining the container identification code by matching the sequence of valid region proposal to the predefined standard container code when all chunks of characters of the predefined standard identification code are contained in at least one sequence of the valid region proposal and identifying, using heuristics, remaining chunks of characters in a sequence of valid region proposals when all chunks of characters of the predefined standard identification code are not contained in at least one sequence of the valid region proposal and determining the container identification code by matching the sequence of valid region proposals and generated remaining chunks to the predefined standard identification code.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 shows ISO 6346 Container code parts with position and type of various character in the ISO code.

DETAILED DESCRIPTION

Figure 1:
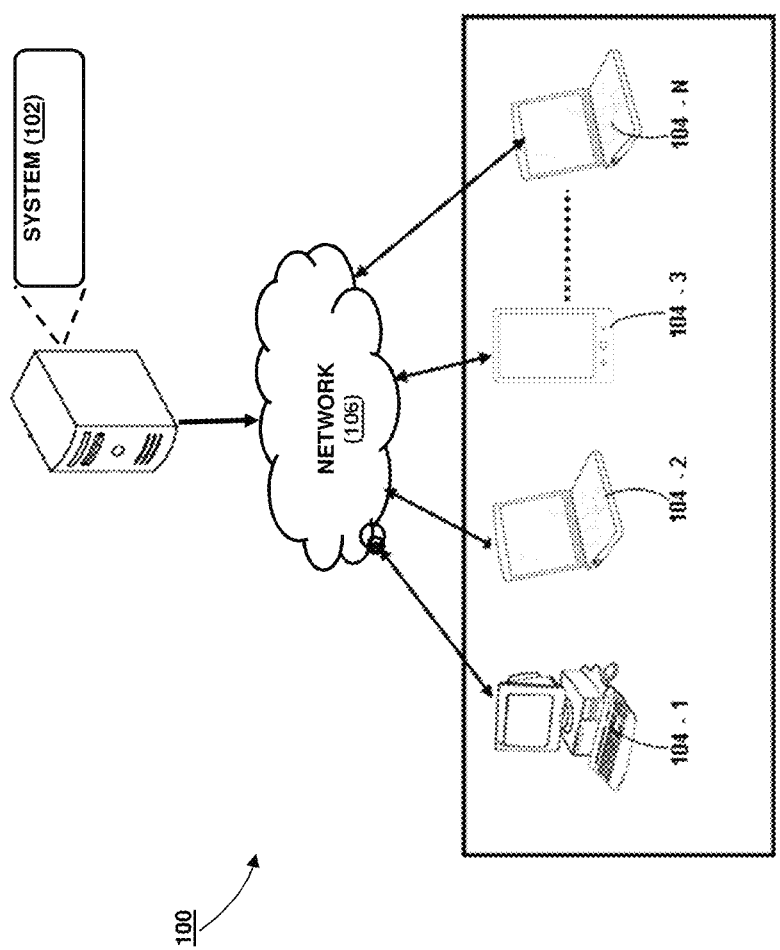
FIG. 1 illustrates a network implementation of a system for, in accordance with an embodiment of the present subject matter.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), plurality of input units, and plurality of output devices. Program code may be applied to input entered using any of the plurality of input units to perform the functions described and to generate an output displayed upon any of the plurality of output devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Any data disclosed herein may be implemented, for example, in one or more data structures tangibly stored on a non-transitory computer-readable medium. Embodiments of the invention may store such data in such data structure(s) and read such data from such data structure(s).

The present application provides a computer implemented method and system for container code recognition via Spatial Transformer Networks and Connected Component.

Referring now to FIG. 1, a network implementation 100 of a system 102 for container code recognition via Spatial Transformer Networks and Connected Component is illustrated, in accordance with an embodiment of the present subject matter. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. In another embodiment, it may be implemented as custom built hardware designed to efficiently perform the invention disclosed. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
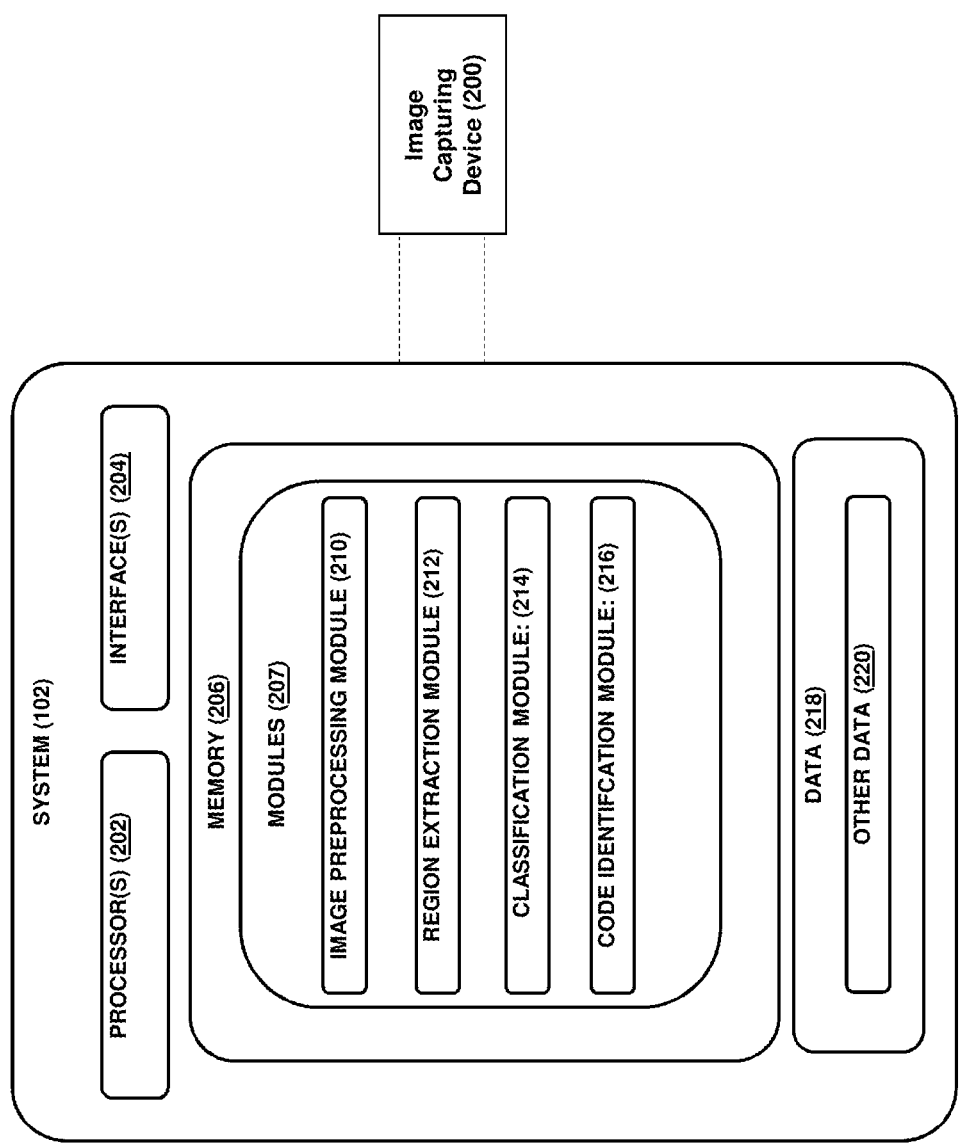
FIG. 2 shows block diagrams illustrating the system for container code recognition, in accordance with an embodiment of the present subject matter.

In one embodiment the present invention, referring to FIG. 2, describes a detailed working of the various components of the system (102). The system (102) comprises a processor (202), a memory (204) and an image capture device (200) operatively coupled with said processor. The image capturing device (200) is configured to capture an image of a container such that the captured image contains the container identification code.

The system (102) further comprises an image preprocessing module (210) configured to pre-process the captured image. In an embodiment image preprocessing may comprise resizing the images to double their original size and binarize them to separate the characters such as to enable easy distillation via connected component (CC) for generating region proposal.

The system further comprises a region extraction module (212) configured to extract and filter region proposals from the pre-processed image to generate regrouped region proposals. In an embodiment extracting region proposal comprises extracting using the CC region proposals proposal such that the region proposal conforms to a predefined container identification code such that extraction of every character in the container code.

Figure 4:
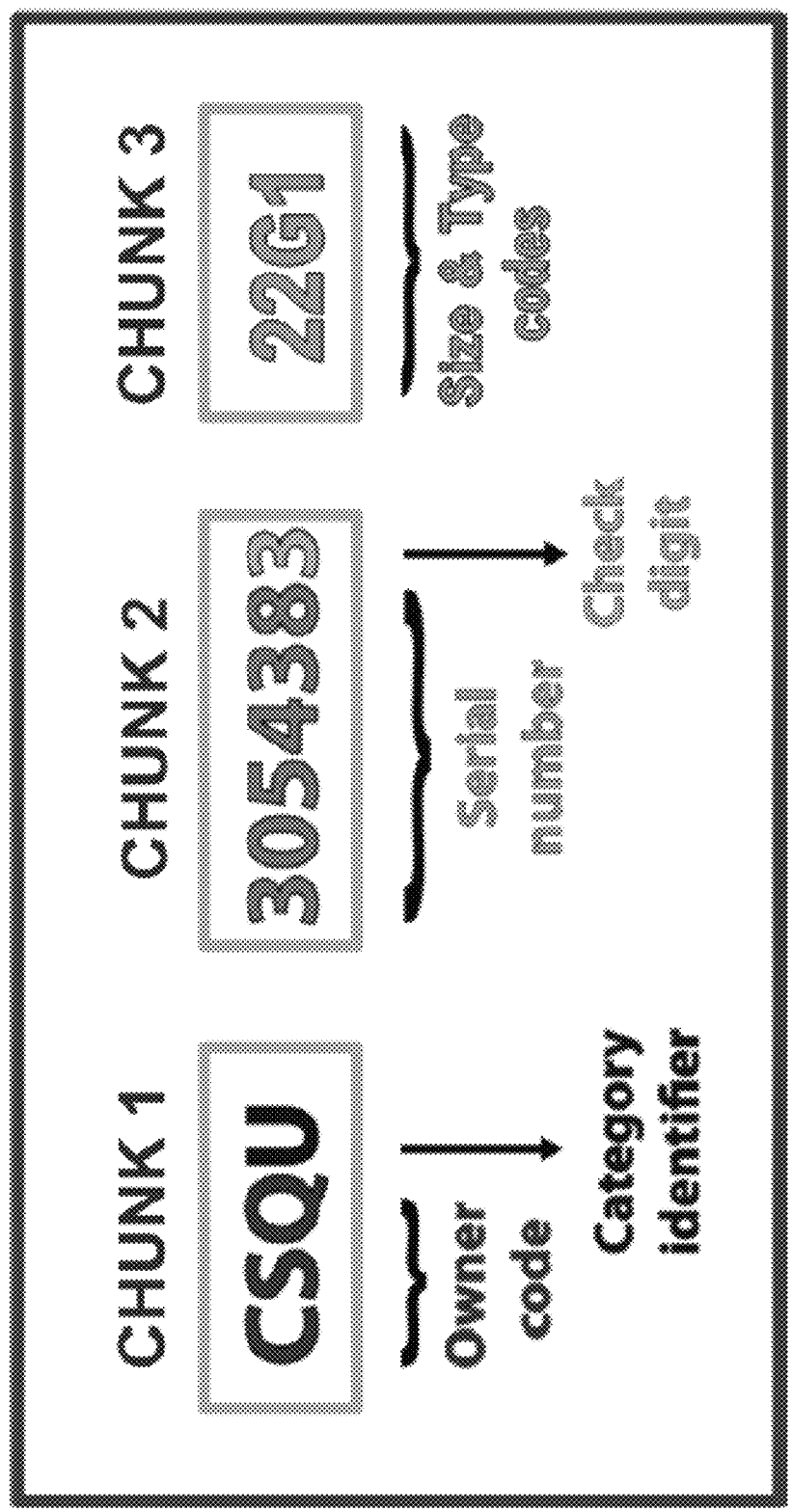
FIG. 4 shows a ISO 6346 Container code parts with different chunks.

Further the region extraction module (212) configured to filter the extracted region proposal to generated filtered region proposals such that the filtered region proposals have lesser false positives due to false positive elimination on the basis of height similarity to get clusters containing characters of similar heights. In an embodiment where the container code is an ISO6346 code, using the predefined structure of the ISO code containing fifteen characters and their bounding boxes being of approximately equal height (as illustrated in FIG. 4), the false positives may be filtered out of the region-proposals by clustering the region proposals on the basis of height similarity to get clusters containing characters of similar heights. Subsequently, the clusters which contain less than fifteen region proposals may be discarded for ISO code. Post this of the noise (non-text region proposals) gets filtered out and clusters containing fifteen or more region proposals are processed further.

Further the region extraction module regroups grouping to preserve the spatial position and sequence of region-proposals of similar heights. In an embodiment where the characters of the container identification code are written spatially close to each other, in fixed horizontal or vertical patterns search is conducted for groups with those patterns and identify windows around potential code characters.

The system (102) as disclosed herein further comprises a classification module (214) configured to classifying the regrouped region proposals into characters by implementing trained Spatial Transformation Network (STN) to generate a valid group of region proposal with more than one chunk of container identification code. In an embodiment classification comprises classifying grouped region proposals to characters via trained $STN_s$ such that $STN_s$ comprises $STN_{alp}$ and $STN_{dig}$ for identifying alphabets and digits respectively. Since the container identification code is a predefined code have a predefined structure the relevant STN can be implemented at relevant STN to get appropriate output from the appropriate classifier at runtime.

Further in one aspect the classification module may be configured to match the output of both STNs to a container identification code directory comprising plurality of predefined standard container identification codes. In an embodiment where the container identification code is an ISO code and the directory is an ISO directory, the set whose first four characters matches with any entry of ISO Code Directory is selected and the rest may be discarded.

It may be noted that the STNs used by the system (102) are pre trained STNs separately for alphabets and digits.

The system disclosed herein further comprises a code identification module (216) configured to determine the container code by generating a sequence for the valid group of region proposal and mapping the generated sequence to a predefined standard container identification code wherein the predefined standard identification code comprises chunks of characters in a predefined pattern.

In an embodiment the code identification module (216) uses the character counts and heuristics over spatial position of groups to generate the sequence for the valid group. Further the number of region proposals inside each matching group are checked and determination as to requirement of more group may be made. Further the existing information regarding the predefined container identification code may be used to extract the code. In an embodiment where the container identification code is an ISO code, the ISO code information may be used to determine the container identification code such that a) If the first group has 15 region proposals, then it means that this group contains all the three chunks of ISO code, i.e., all the 15 characters of the ISO code and it is written in single line (horizontally/vertically). Therefore, this group may be selected as the final output group. b) If there are 11 region proposals in the first group, then this implies that this group contains the first two chunks of the ISO code. Then the third chunk by may be searched by finding the nearest group having exactly 4 region proposals in the same (horizontal or vertical) pattern and identifying this group as the final group. c) If the matching group has four character region proposals, then it means this group is the first chunk of the ISO code, then the remaining two chunks are searched by searching for groups containing at least seven characters (corresponding to the second chunk) and so on. This process may similarly be implemented for various different container identification code based on similar characteristic.

After the above mentioned analysis is performed using the code identification module as a result, final group are identified. In case of ISO codes the number of final groups we get here may be either 1, 2 or 3. If it is 1, it means that it has all the 15 characters of ISO code. If it is 2, it means that one of the two groups has one chunk and other group has two chunks of ISO code. If it is 3, it means that every group has one chunk of ISO code. Similar analysis is be made for various other container identification code based on characteristics for the code.

The above final output is then mapped to the STN output to generate a sequence of code which is determined as the container identification code of the container. In an embodiment where the container identification code is an ISO code the ISO Code pattern as shown in FIG. 5 is used to decide the type of STN to apply for recognition of each one of 15 region proposals. The first four characters are recognized using $STN_{alp}$, next seven characters are recognized using $STN_{dig}$, next two again using $STN_{dig}$, and the final two characters via $STN_{alp}$ and $STN_{dig}$ respectively. The combination leads to the final output i.e. the 15 character ISO code written over the container body.

In an embodiment where the system (102) is unable is identify the container code after the processing mentioned herein the system may trigger an alert signifying that a container code was not determined by the system. The code identification module (216) may be configured to trigger such alert.

Figure 3:
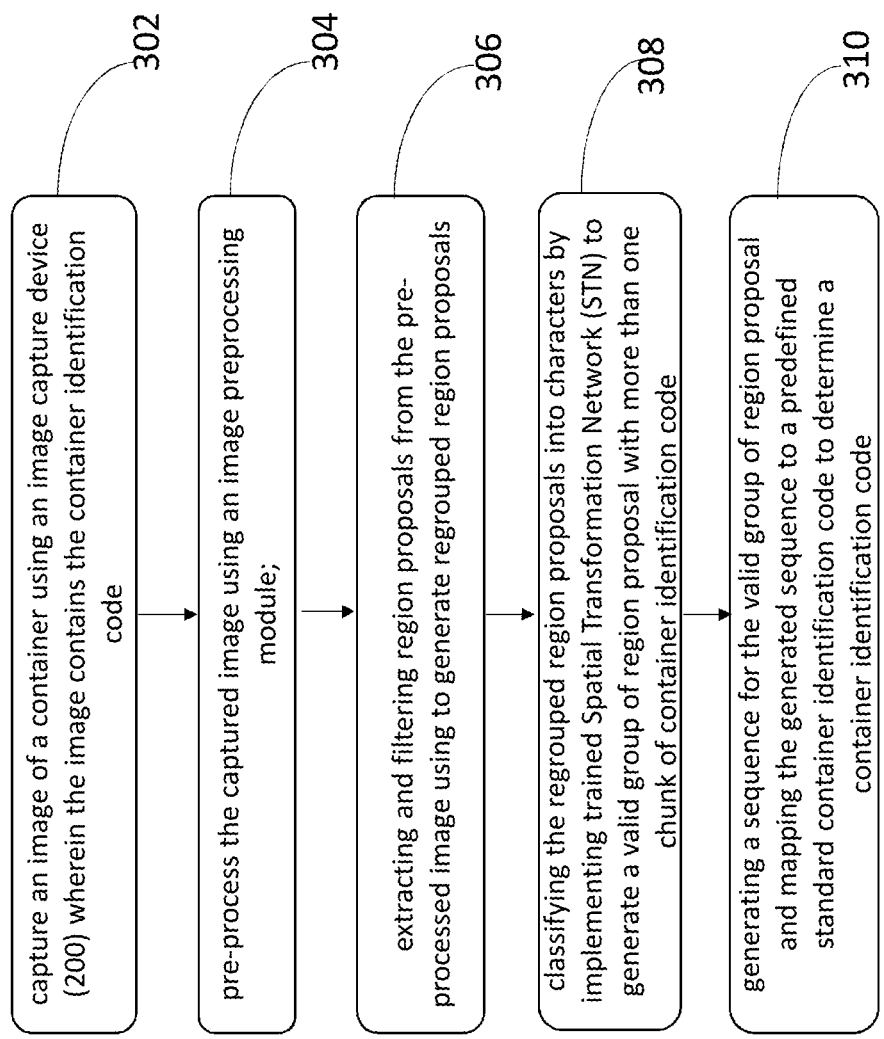
FIG. 3 shows a flowchart illustrating the method for container code recognition via, in accordance with an embodiment of the present subject matter.

Referring now to FIG. 3 a flow chart illustrating the method for method for container code recognition via Spatial Transformer Networks and Connected Component is shown. The process starts at step 302 where an image of a container is captured using an image capture device wherein the image contains the container identification code.

At the step 304 the captured image is pre-processed using an image preprocessing module. In an aspect preprocessing may comprise resizing the images to double their original size and binarize them to separate the characters such as to enable easy distillation via connected component (CC) for generating region proposal.

At the step 306 the method comprises extracting and filtering region proposals from the pre-processed image using to generate regrouped region proposals. Further at the step 308 method comprises classifying the regrouped region proposals into characters by implementing trained Spatial Transformation Network (STN) to generate a valid group of region proposal with more than one chunk of container identification code.

Lastly at the step 310 a container identification code is determined by generating a sequence for the valid group of region proposal and mapping the generated sequence to a predefined standard container identification code.

In an embodiment where no container identification code may be determined, the method may further comprise the step of trigger an alert signifying that no container code is determined after implementing the method.

In another embodiment where the container identification code is an ISO code the method disclosed herein may further comprise validating the determined ISO (container identification code) code using the checksum digit for ISO 6346 code.

The following paragraphs contain experimental results which are intended to illustrate the working of the proposed system and method and its efficiency and accuracy. The implementation of the system and method as disclosed in the following paragraphs is one of many and they may not be taken as limiting the scope of the instant invention, which is limited only by the following claims.

The experiments were conducted on a server equipped with an Intel Xeon® processor and an NVIDIA Quadro 4000 GPU with 40 GB of RAM. The proposed method takes approx. 2.47 seconds per container image for recognition of the complete container code using the aforementioned hardware specifications. It should be noted here that all the experiments were conducted on different datasets and are, therefore, not directly comparable.

Despite direct comparison not being possible, the size of the dataset is kept very similar to the sizes mentioned in the prior references and we chose the test set to be as difficult and varied in terms of camera angle, size, occlusion, and color. Table I below shows accuracy results for character detection, recognition and full code extraction by the proposed invention.

TABLE I

| Code Characters | Detection Rate | Recognition Rate | Overall Rate (Detection + Recognition) |
|---|---|---|---|
| Alphabets | 100% | 98.96% | 98.96% |
| Digits Only | 100% | 100% | 100% |
| Complete Code | 100% | 99.64% | 99.64% |

Nineteen test images of containers comprising of 280 character windows of ISO6346 code were used. The disclosed inventions method is able to detect all the 280 character windows from 19 test images of container, i.e. 100% coverage for text detection was achieved. Further all but one character were determined correctly, i.e., an accuracy of 99:64%. Hence accuracy on detecting the complete container code was 95% with the method able to recognize the complete correct code of 18 out 19 images.

For benchmarking, Tesseract3 recognition engine is employed on test image set which achieved 38.57% accuracy, i.e. only 108 out of 280 characters were recognized correctly. Also FasterRCNN detector when evaluated on the test images achieved average recognition accuracy of 48%, with 43% and 51.50% for alphabets and characters respectively illustrating the efficient and robust nature of the instant invention.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for determining container identification code via Spatial Transformer Networks (STN) and Connected Component (CC), said method comprising a hardware processor implemented steps of:
    capturing an image of a container using a camera, wherein the image contains the container identification code;
    pre-processing the captured image;
    extracting and filtering region proposals from the pre-processed image to generate regrouped region proposals, wherein extraction and filtration is performed by implementing connected components (CC);
    classifying the regrouped region proposals into characters by implementing trained Spatial Transformation Network (STN) to generate a valid group of region proposals with more than one chunk of container identification code; and
    generating a sequence for the valid group of region proposals and mapping the generated sequence to a predefined standard container identification code to determine the container identification code, wherein the predefined standard identification code comprises chunks of characters in a predefined pattern, wherein generating the sequence comprising:
        determining the container identification code by matching the sequence of valid region proposals to the predefined standard container code when all chunks of characters of the predefined standard identification code are contained in at least one sequence of the valid region proposal; and
        identifying, using heuristics, remaining chunks of characters in a sequence of valid region proposals when all chunks of characters of the predefined standard identification code are not contained in at least one sequence of the valid region proposal and determining the container identification code by matching the sequence of valid region proposals and generated remaining chunks to the predefined standard identification code.

2. The method according to claim 1 further comprising triggering an alert when the container identification code is not determined after generating and mapping the valid group of region proposals.

3. The method according to claim 1 wherein the container identification code is an ISO (International Standard Organization) 6346 code, further comprising, validating the determined container identification code using checksum digit for ISO 6346 code.

4. The method according to claim 1 wherein image preprocessing comprises the steps of:
    resizing the images to double the original size of the image; and
    binarizing the resized image separate one or more characters of the container code in the image.

5. The method according to claim 1 wherein generating the regrouped region proposals comprises the steps of:
    extracting the region proposals using connected components wherein the extracted region proposals are according to the structure of the predefined standard code;
    filtering false positive from the extracted region proposals; and
    regrouping the region proposals after elimination of false positives based on similarity of spatial position and sequence of region proposals of similar heights.

6. The method according to claim 1 wherein generate a valid group of region proposals comprises the steps of:
    classifying the grouped region proposals to characters by using trained STNs including a STN for alphabets (STNalp) and a STN for digits (STNd); and
    matching the grouped region proposals to the characters from a predefined standard code directory to generate valid region proposals wherein the predefined standard code directory comprises at least one chunk of characters of the predefined standard identification code.

7. A system (102) for determining container identification code via Spatial Transformer Networks (STN) and Connected Component (CC), comprising a processor (202), a memory (204) and a camera operatively coupled with said processor, the system configured to:

capture an image of a container wherein the image contains the container identification code;

pre-process the captured image;

extract and filter region proposals from the pre-processed image to generate regrouped region proposals, wherein extraction and filtration is performed by implementing connected components (CC);

classify the regrouped region proposals into characters by implementing trained Spatial Transformation Network (STN) to generate a valid group of region proposals with more than one chunk of container identification code; and generate a sequence for the valid group of region proposals and mapping the generated sequence to a predefined standard container identification code to determine the container identification code, wherein the predefined standard identification code comprises chunks of characters in a predefined pattern, wherein the system is further configured to:

determine the container identification code by matching the sequence of valid region proposals to the predefined standard container code when all chunks of characters of the predefined standard identification code are contained in at least one sequence of the valid region proposal; and identify, using heuristics, remaining chunks of characters in a sequence of valid region proposals when all chunks of characters of the predefined standard identification code are not contained in at least one sequence of the valid region proposal and determining the container identification code by matching the sequence of valid region proposals and generated remaining chunks to the predefined standard identification code.

8. The system according to claim 7 is further configured to trigger an alert when a container identification code is not determined after generating and mapping the valid group of region proposals.

9. The system according to claim 7 is further configured to:

resize the images to double the original size of the image; and binarize the resized image separate one or more characters of the container code in the image.

10. The system according to claim 7 is further configured to:

extract the region proposals using connected components (CC) wherein the extracted region proposals are according to the structure of the predefined standard code;

filter false positive from the extracted region proposals; and regroup the region proposals after elimination of false positives based on similarity of spatial position and sequence of region proposals of similar heights.

11. The system according to claim 7 is further configured to:

classify the grouped region proposals to characters by using trained STNs including a STN for alphabets (STNalp) and a STN for digits (STNd); and match the grouped region proposals to the characters from a predefined standard code directory to generate valid region proposals wherein the predefined standard code directory comprises at least one chunk of characters of the predefined standard identification code.

12. One or more non-transitory machine readable information storage mediums comprising one or more instructions which when executed by one or more hardware processors causes the one or more hardware processors to perform a method for determining container identification code via Spatial Transformer Networks (STN) and Connected Component (CC), said method comprising:

capturing an image of a container using a camera, wherein the image contains the container identification code;

pre-processing the captured image;

extracting and filtering region proposals from the pre-processed image to generate regrouped region proposals, wherein extraction and filtration is performed by implementing connected components (CC);

classifying the regrouped region proposals into characters by implementing trained Spatial Transformation Network (STN) to generate a valid group of region proposals with more than one chunk of container identification code; and generating a sequence for the valid group of region proposals and mapping the generated sequence to a predefined standard container identification code to determine the container identification code, wherein the predefined standard identification code comprises chunks of characters in a predefined pattern, wherein generating the sequence comprising:

determining the container identification code by matching the sequence of valid region proposals to the predefined standard container code when all chunks of characters of the predefined standard identification code are contained in at least one sequence of the valid region proposal; and identifying, using heuristics, remaining chunks of characters in a sequence of valid region proposals when all chunks of characters of the predefined standard identification code are not contained in at least one sequence of the valid region proposal and determining the container identification code by matching the sequence of valid region proposals and generated remaining chunks to the predefined standard identification code.

13. The one or more non-transitory machine readable information storage mediums of claim 12, further comprising triggering an alert when the container identification code is not determined after generating and mapping the valid group of region proposals.

14. The one or more non-transitory machine readable information storage mediums of claim 12, wherein the container identification code is an ISO (International Standard Organization) 6346 code, further comprising, validating the determined container identification code using checksum digit for ISO 6346 code.

15. The one or more non-transitory machine readable information storage mediums of claim 12, wherein image preprocessing comprises the steps of:

resizing the images to double the original size of the image; and binarizing the resized image separate one or more characters of the container code in the image.

16. The one or more non-transitory machine readable information storage mediums of claim 12, wherein generating regrouped region proposals comprises the steps of:

extracting the region proposals using connected components wherein the extracted region proposals are according to the structure of the predefined standard code;
filtering false positive from the extracted region proposals; and
regrouping the region proposals after elimination of false positives based on similarity of spatial position and sequence of region proposals of similar heights.

17. The one or more non-transitory machine readable information storage mediums of claim 12, wherein generate a valid group of region proposals comprises the steps of:
classifying the grouped region proposals to characters by using trained STNs including a STN for alphabets (STNalp) and a STN for digits (STNd); and
matching the grouped region proposals to the characters from a predefined standard code directory to generate valid region proposals wherein the predefined standard code directory comprises at least one chunk of characters of the predefined standard identification code.

* * * * *